United States Patent

Cravens, Jr.

[15] 3,680,437
[45] Aug. 1, 1972

[54] MILLING MACHINE DRAW BAR DEVICE

[72] Inventor: Mark C. Cravens, Jr., 18852 Plummer Ave., Northridge, Calif. 91324

[22] Filed: July 15, 1970

[21] Appl. No.: 55,194

[52] U.S. Cl. ................................. 90/11 D, 408/239
[51] Int. Cl. .......................... B23b 47/00, B23c 9/00
[58] Field of Search......90/11 A, 11 D; 408/238, 239

[56] References Cited

UNITED STATES PATENTS 2,994,250   8/1961   Walter et al. ................. 90/11 D

*Primary Examiner*—Francis S. Husar
*Attorney*—Vincent C. Tyrrel

[57] ABSTRACT

There is described in the specification a manually operated drawbar device for changing the collet or cutting tool on a milling head of a milling machine. The drawbar device is lowered to engage the drawbar head with a wrench socket. The socket is rotated in either direction with a hand crank and chain drive to loosen or secure a collet or cutting tool in the milling head spindle. After loosening the drawbar head and raising the wrench socket from engagement with the drawbar head, the drawbar head is automatically impacted to ensure that the collet or tool releases readily from the spindle.

3 Claims, 4 Drawing Figures

Mark C. Cravens, Jr.
INVENTOR.
BY Vincent C. Tyrrell
Agent

MILLING MACHINE DRAW BAR DEVICE

GENERAL BACKGROUND, OBJECTS AND SUMMARY OF INVENTION

Those skilled in the art of operating milling machines have recognized for many years that a better, and time-saving method for removing or releasing drawbar collets or tool shanks would increase production and increase operator efficiency.

A typical manner in which a drawbar collet is loosened today is by turning the drawbar head with a wrench and if the collet will not come out readily, manual force must be applied to the drawbar head or the collet with the resultant possibility of damage to the machine. This method of collet removal is time-consuming and reduces the efficiency of the milling machine operator.

It is an object of the present invention to advance the art beyond using tedious, manual methods by providing a drawbar collet or tool removal device which minimizes manual exertion.

It is another object of the invention to provide an integral, hand-operated device that will facilitate the removal of drawbar collets or tools by requiring less time to change collets or tools.

It is another object of the invention to ensure the collets removal by providing an automatic impact force upon the drawbar head, and thus upon the collet, thereby loosening same.

In accomplishing these objectives there is presented through the invention a drawbar collet or tool-removing device comprising a hand-cranked, chain-driven socket wrench, slidable vertically and supported above the drawbar head on the milling machine. A handle and lever is provided to lower the socket over the drawbar head which is usually in the form of a hexagon head and has a right-hand thread for retaining the collet. The crank handle is then turned in a clockwise direction to tighten said collet or tool, and in a counterclockwise direction to loosen said collet or tool.

A significant facet of the invention is an impact weight positioned above the socket wrench and supported therethrough. When the handle is lowered to engage the drawbar head with the socket wrench, the impact weight is spring-loaded so that when the handle is raised to render the socket wrench inoperative, the impact weight is unlatched and strikes the drawbar head with sufficient force to loosen the collet and the tool bit therefrom.

BRIEF DESCRIPTION OF THE DRAWINGS

While the invention is particularly pointed out and distinctly claimed in the concluding portion of the specification, a preferred embodiment is described in the following detailed description which may be best understood when read in connection with the accompanying drawings, in which:

FIG. 4 is a partial sectional view of the lower spindle end showing a solid tool.

DETAILED DESCRIPTION OF THE PREFERRED EMBODIMENT

Figure 1:
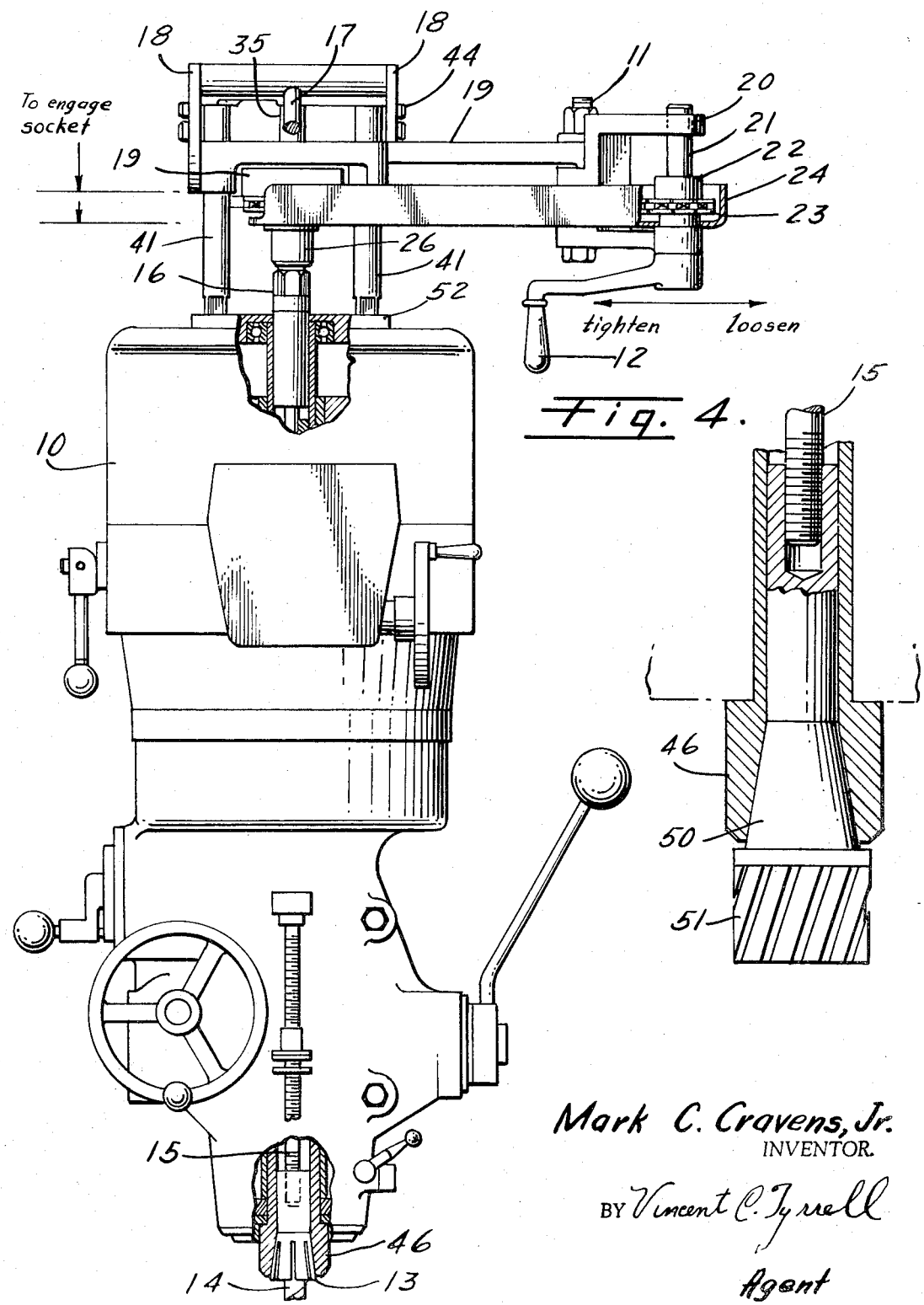
FIG. 1 is a front elevational view of the milling machine head embodying the invention in which part of the housing is broken away to expose the collet and the collet supporting spindle area and the drawbar.

Referring now to the drawings in which like numerals are used to indicate like parts throughout the various views thereof, FIG. 1 shows a milling machine head 10 of a milling machine with the drawbar wrench 11 in accordance with the present invention. The drawbar wrench 11 is mounted on the bearing cap 52 of the milling machine head and is supported therefrom by posts 41. As is typical in this kind of machine, the drawbar 16 extends through the hollow spindle 46 and is attached to the collet 13, or other tool shank, by a screw thread connection. The top of the drawbar has a head adapted for rotating the drawbar, and screw thread on the lower end of the drawbar is usually a right-hand thread. To hold a tool firmly, the tool is inserted and positioned properly in the collet, then the drawbar wrench is lowered into position to engage the drawbar head and is turned clockwise, pulling the tapered portion 52 of the collet 13 firmly against the tapered seat of the spindle 46.

Figure 2:
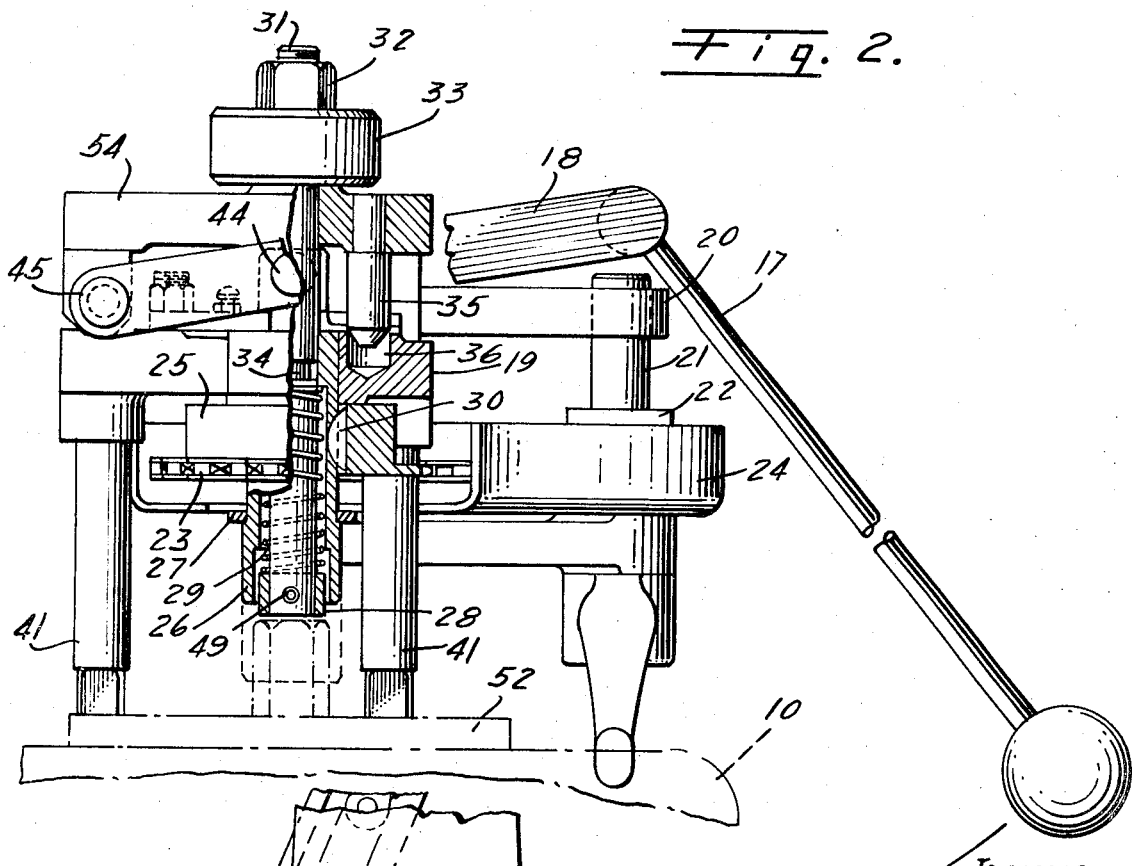
FIG. 2 is a partial cross-sectional view of the drawbar device in side elevation.

Referring now to FIG. 2, the drawbar wrench apparatus is supported by three posts 41 which are secured to the bearing cap 52 of the milling machine head 10. The posts 41 are securely attached to support bracket 54. A carriage slide 19 is supported by the three posts 41 and is vertically movable thereon. A spindle 31 is axially aligned with said drawbar and is slidably mounted in support bracket 54. An impact mass 33 is secured to the upper end of spindle 31 by a nut 32. A collar 28 is attached to the lower end of spindle 31 by a pin 49. A wrench socket 26 is slidably mounted on spindle 31 and is rotatable in carriage slide 19. Directly below said slide, a roller chain sprocket 25 is attached to said wrench socket by a Woodruff key 30. A spring 29, positioned between the spindle collar 28 and a counter bore of the wrench socket, maintains the carriage slide 19 and wrench socket 26 in a position above said drawbar 16 to allow normal rotational operation of the milling machine spindle. The outer end of the carriage slide 19 supports a yoke 20. A rotatable shaft 21 is supported by said yoke, and a hand crank 12 and a roller chain sprocket 22 is fixed to the shaft 21. A roller chain 23 is positioned around sprockets 22 and 25. The number of teeth in sprocket 22 can be less than the number of teeth in sprocket 25 so that a mechanical advantage may be enjoyed by the operator turning hand crank 12 to operate the wrench socket. A chain guard 24 is supported by shaft 21 and wrench socket 26. It is contemplated that gearing or other motion-transmitting devices could be used for rotating the wrench socket.

Figure 3:
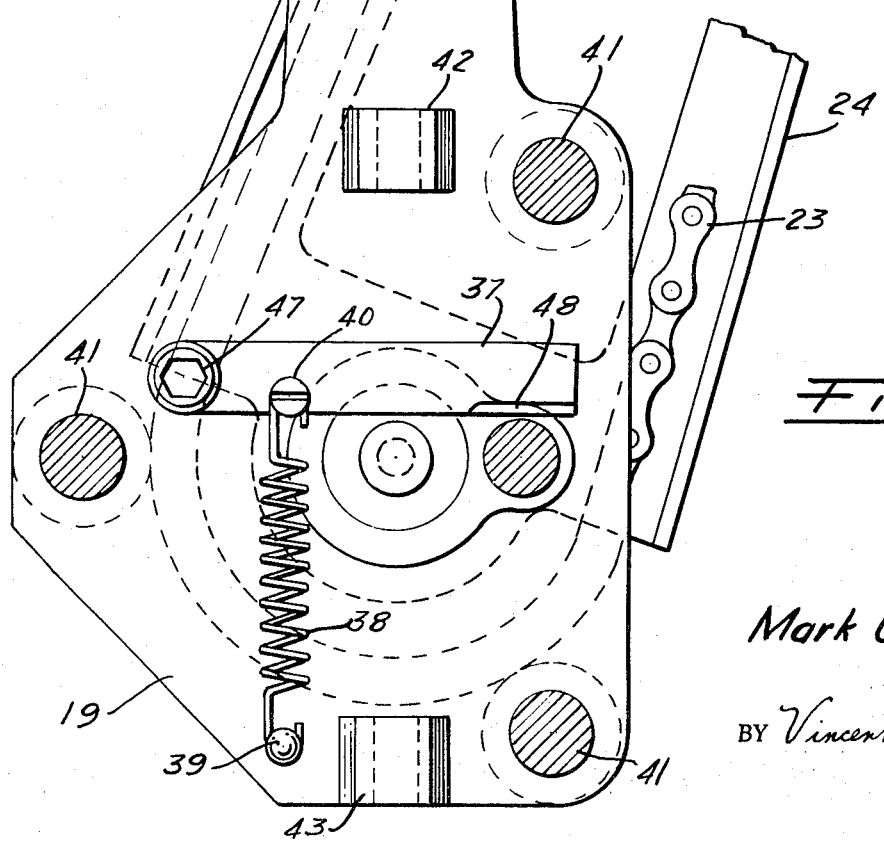
FIG. 3 is a top elevational view showing the socket wrench support slide and latch mechanism.

Referring now to FIG. 3, a latch lever 37 is hinged by fastener 47 and is held against the ejecting spindle 31 by a tension spring 38. A pin 40 is used to secure one end of spring 38 to the latch lever 37 and a pin 39 is mounted on carriage slide 19 to secure the other end of spring 38 and is positioned to provide proper tension in the spring. Now referring again to FIG. 2, a handle 17 is attached to a U-shaped yoke 18. The yoke is supported by two pins 45 to stationary support bracket 54 and to carriage slide 19 by two pins 44 which are, in turn, fixedly held by bosses 42 and 43 of the carriage slide 19. This arrangement allows the carriage slide 19 to be raised or lowered by the up-or-down movement of handle 17.

In operation of the drawbar wrench, the spindle 46 of the milling machine head is locked into a stationary position by means provided on machines of this nature. The handle 17 is lowered so that the wrench socket 26 engages the drawbar head. When the handle is lowered, the latch lever 37 is moved into the recess undercut 34 in the ejecting spindle 31. This action will contain the spring 29 in a compressed condition. With the wrench socket then in position, the wrench hand crank 12 is rotated in a counter-clockwise direction to loosen collet 13. Then, as the handle 17 is raised to disengage the wrench socket from the drawbar head, the latch 37 is cammed out of the undercut in spindle 31 by a chamfered pin 35, thus releasing the spring-loaded impact mass 33 and spindle 31 upon drawbar head 16 with an impact sufficient to provide an automatic release of the collet or other tool shank from the tapered seat of spindle 46. The camming pin 35 is fixedly mounted in support bracket 54 and is aligned with a recess 36 in the carriage slide 19.

FIG. 4 illustrates an alternate form of tool retention in a milling machine head. This alternate form uses, by way of an example, a solid tool which incorporates a threaded shank for engagement by said drawbar, a tapered portion 50 to coincide with the tapered portion within the milling head spindle 46 and a cutting end 51 which may be provided with means to remove metal. The solid tool 51 is retained in the milling machine spindle by the threaded drawbar. The drawbar wrench rotates the drawbar into the solid tool by means of a threaded connection as described heretofore. When the drawbar is turned clockwise, the solid tool 51 is drawn into the tapered portion of the spindle 46 to ensure co-rotation with the spindle when in use. To remove the solid tool, the handle 17 is lowered to engage the drawbar head and the hand crank is then rotated in a counter-clockwise direction to loosen the drawbar slightly in the solid tool. The handle 17 is then raised so that the impact weight is released to strike the top of the drawbar head and thus break the holding tendency between the tapered seat of the spindle and the like tapered portion of the solid tool. The drawbar head is again engaged to provide complete removal of the solid tool if desired.

In describing the invention, reference has been made to the preferred embodiment. However, those skilled in the art of milling machine operation and familiar with the disclosure of this embodiment may well recognize additions, deletions, substitutions, or other modifications which would fall within the scope of the invention as defined within the appended claims.

I claim:

1. A device for securing collets or tools to, or for removing from, the spindle of a milling machine head having a screw-type drawbar, said device comprising:
    a rotatable wrench socket mounted above and axially aligned with the drawbar of said milling machine, said drawbar including a turnable drawbar head connected with its upper end;
    holding means connected with said drawbar at its lower end and operable to secure a tool thereto;
    rotating means connected to said wrench socket and operable to turn said wrench socket in either direction;
    handle means connected with said wrench socket and operable to lower said wrench socket into engagement with said drawbar head and to raise said wrench socket out of engagement with said drawbar head;
    impact means positioned above said drawbar head; and
    release means operable connected with said handle means and operable when said handle means is in one position to prevent downward movement of said impact means and operable when said handle means is moved to another position to permit downward movement of said impact means into impacting engagement with said drawbar head, said impacting engagement of said impact means with said drawbar head being operable to tend to cause said holding means to release said tool.

2. The device of claim 1 wherein the rotating means is manually actuated.

3. A device for securing a collet or a tool to, or removing a collet or tool from, the spindle of a milling machine head of the type having a screw-type drawbar with turntable head, said device comprising:
    a stationary support means for said device positioned above said turnable head;
    a rotatable wrench socket;
    shaft means axially aligned with said drawbar and slidable in said support means to support said wrench socket;
    handle means pivotally connected to said shaft means to move said wrench socket into engagement with said drawbar head and to move said wrench socket out of engagement with said drawbar head;
    rotating means rotatably connected to said wrench socket and operable to turn said wrench socket in either of opposite rotary directions;
    impact means positioned above said drawbar head and carried on said shaft means and axially movable therewith;
    resilient means operable to urge said impact means toward said drawbar head;
    latch means positioned to engage said shaft means and operable to hold said resilient means in compression when said handle means is moved downwardly to engage said drawbar head; and
    camming means operable to disconnect said latch means when said handle is moved upwardly thereby releasing said impact means to strike said drawbar head.

* * * * *